B. E. MARSHALL.
SAW GAGE.
APPLICATION FILED OCT. 18, 1913.
1,181,468.
Patented May 2, 1916.
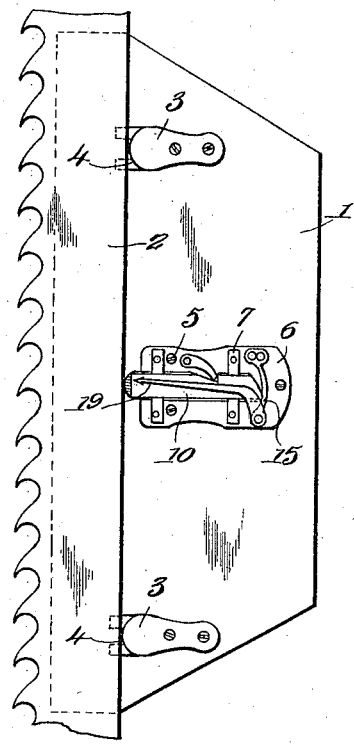
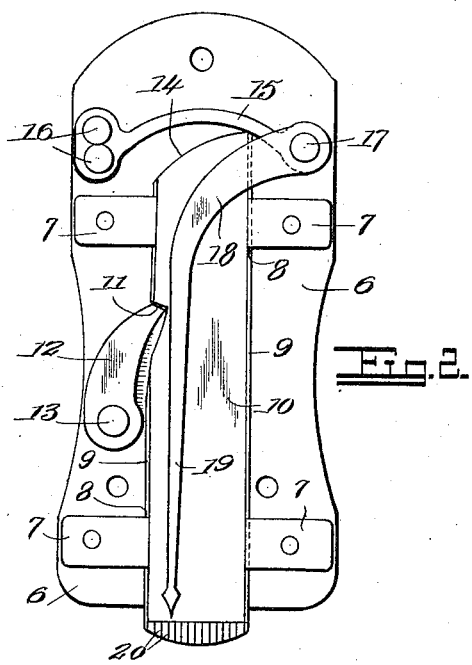
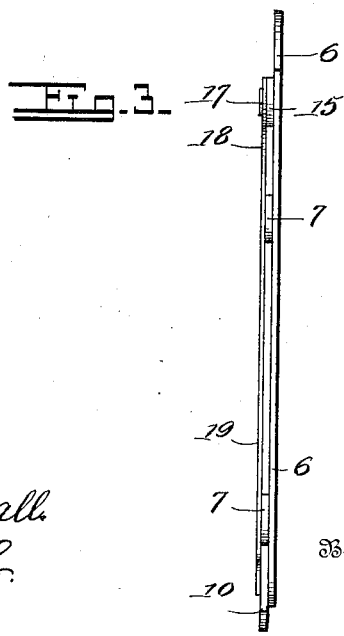
Witnesses
Edw. S. Hall.
W. E. Valk Jr.
Inventor
Bruno Edward Marshall,
By Richard Eiwen,
his Attorney

UNITED STATES PATENT OFFICE.

BRUNO EDWARD MARSHALL, OF WILLIAMS, ARIZONA.

SAW-GAGE.

1,181,468.  Specification of Letters Patent.  Patented May 2, 1916.

Application filed October 18, 1913. Serial No. 796,034.

*To all whom it may concern:*

Be it known that I, BRUNO EDWARD MARSHALL, subject of the German Emperor, residing at Williams, in the county of Coconino and State of Arizona, have invented certain new and useful Improvements in Saw-Gages, of which the following is a specification.

This invention relates to an improved means for detecting any deviation from a straight line in the back edge of a band saw.

It is the primary object of the present invention to provide an improved gage for saws adapted to indicate on a scale the amount of curvature of the saw, the action of the gage being automatic upon placing the same tightly against the back edge of a saw or other surface to be gaged.

It is well known that due to constant or prolonged use, and through sharpening operations, the front or cutting edge of a band saw becomes longer than the back edge thereof, thereby causing the said back edge to become concaved, which concavity renders the saw practically useless.

Therefore, it is an object of this invention to provide a simple, efficient and durable device adapted for gaging the back edge of a band or similar saw, when removed from the machine in connection with which it is employed.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a plan view illustrating the application of the invention; Fig. 2 is an enlarged top plan view of the gage comprising the present invention; and Fig. 3 is an edge view of the same.

Referring now to the drawings, wherein is illustrated the preferred embodiment of the invention, the numeral 1 designates a work bench of any suitable construction, upon which a band saw designated 2 is adapted to be placed during a gaging operation. In spaced relation upon the upper face of the bench 1, I provide a pair of alined and fixedly secured stop blocks 3, one face of each block being curved as at 4 against which the back edge of the saw acted upon is fitted, the saw when in engagement with both of the curved faces and the said two blocks being maintained or supported in a position whereby an effectual gaging thereof may be accomplished in a manner to be hereinafter fully described.

Between the blocks 3 and fixedly secured to the bench 1 by means of screws 5, I provide a base plate 6 upon the upper face of which the indicating mechanism comprising the present invention is arranged. Guide blocks 7 are secured in any suitable manner to the base plate 6 of the gage, the said blocks being arranged in pairs, one pair being disposed adjacent the respective extremities of the said plate, the inner faces of the said blocks being beveled as at 8 against which the correspondingly beveled edges 9 of a slide member 10 are fitted. By the arrangement of the slide member 10 between the said blocks 7, it is apparent that the former is maintained against lateral or vertical movement independent of the plate, and that longitudinal or sliding movement can be imparted to the said slide member only by exerting pressure upon either end thereof. A notch 11 is formed in the said slide member 10 at a point intermediate its ends and upon one side thereof, within which a pawl 12, fixedly secured as at 13 to the plate member 6 is fitted, the said pawl serving in the capacity of a stop to limit the outward sliding movement of the said member 10. The inner end of the slide member 10 is curved as at 14, in the arc of a circle of greater radius than that from which a plate spring 15 associated therewith is described, the said spring being fixedly secured as at 16 to the plate member 6, its free end being disposed for engagement with the pointed extremity of the slide member 10 to normally maintain the latter in extended position or in firm engagement with the pawl 12 providing a stop therefor.

Fixedly secured as at 17 to the free end of the spring member 15 and curved as at 18 to lie normally in a plane parallel with the slide member 10, I provide an indicator 19 the free end of which terminates at a point adjacent the outer extremity of the slide member 10 to indicate thereupon the slightest deviation from a straight line when applied to the back edge of a band saw in connection with which the gage comprising the present invention is adapted to be employed. Graduation marks 20 are indicated upon the slide member 10 at the outer extremity thereof to determine or signify the degree of deviation by the position of the indicator 19 relative thereto.

Having described in detail the construction of the gage, it now remains to set forth specifically the operation thereof. The band saw 2 acted upon is first positioned with its back edge firmly in engagement with the stop-blocks 3 and the free or outer end of the slide member 10, the engagement between the saw and the said slide member 10 being of such a nature as to slightly force the said slide member inwardly to position the indicator 19 at a point parallel with the longitudinal axis of the said slide. When thus positioned, any deviation from a straight line upon the back edge of the saw 2 can be readily determined by observing the movement of the hand 19. Should the slide member 10 come into engagement with a convexed surface upon the back edge of the saw, the said slide member is slightly compressed, in which event the tension of the spring 15 to which the indicating hand 19 is secured will cause the said hand to move to one side of the longitudinal axis of the slide member 10 thereby to indicate upon the graduation mark 20 the degree of deviation. In the event of the slide member 10 coming in contact with a concavity of the saw 2, the tension of the said spring 15 will cause the said slide member to move outwardly and at the same time swing the indicator 19 toward the opposite edge of the slide member 10.

From the above, taken in connection with the accompanying drawings, it is apparent that the slightest irregularity, ridge or depression upon the back edge of the saw may be quickly detected by the application of the gage thereto; that the disposition of the indicator 19 and slide member 10 with respect to the back edge of the saw is of such a nature as to greatly magnify the irregularity upon the back edge of the saw; and that the movement of the indicator is controlled entirely by the sliding movement of the slide member 10, which movement either decreases or increases the tension of the spring 15 to which the said indicator is connected.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A gage for saws including a slide member directly engageable with the saw acted upon, a support for said slide, a dial upon said slide, spring means directly engaging with said slide, an indicator affixed to the spring and traversing the dial, the said indicator being movable through actuation of the slide against tension of said spring, and a support means for the saw.

2. A gage for saws including a member movable relatively to the saw acted upon, a spring of the plate-type with which the said member is engageable, means limiting movement of the member against tension of its engaging spring, a dial upon said member, a support for said member, an indicator affixed to the free end of the spring, the indicator being adapted to traverse the dial, actuation of the indicator being effected through movement of said member against tension of the spring, and a support means for the saw.

3. A saw-gage including in combination, a pair of stationary stop-blocks against which the edge of the saw to be gaged is fitted, a slide member disposed for engagement with the said saw, the longitudinal edges of the said slide being beveled throughout their entire length, guide blocks arranged in pairs, one pair adjacent each extremity of the said slide, the inner faces of the said guide blocks being beveled to correspond to the beveled faces of the said slide, a base plate to which the said blocks are secured and upon which the said slide is disposed, a fixed pawl carried by the said base plate and disposed for engagement with a notch formed within the said slide to limit the movement thereof, a fixed spring carried by the said base plate and disposed for engagement with one extremity of the said slide to normally exert an outward pressure thereupon, and an indicator hand secured to the free end of the said spring and disposed to extend in a plane parallel with the longitudinal axis of the said slide to indicate at a point adjacent its point of connection with the said saw the degree of movement imparted to the said slide by reason of its engagement with the said saw, as and for the purpose set forth.

In testimony whereof I affix my signature in presence of two witnesses.

BRUNO EDWARD MARSHALL.

Witnesses:
 OLOF SARDIN,
 C. E. STACKUS.